March 13, 1956 J. N. BINNS ET AL Re. 24,127
ADJUSTABLY MOUNTED INSULATOR ASSEMBLY
Original Filed Oct. 18, 1949
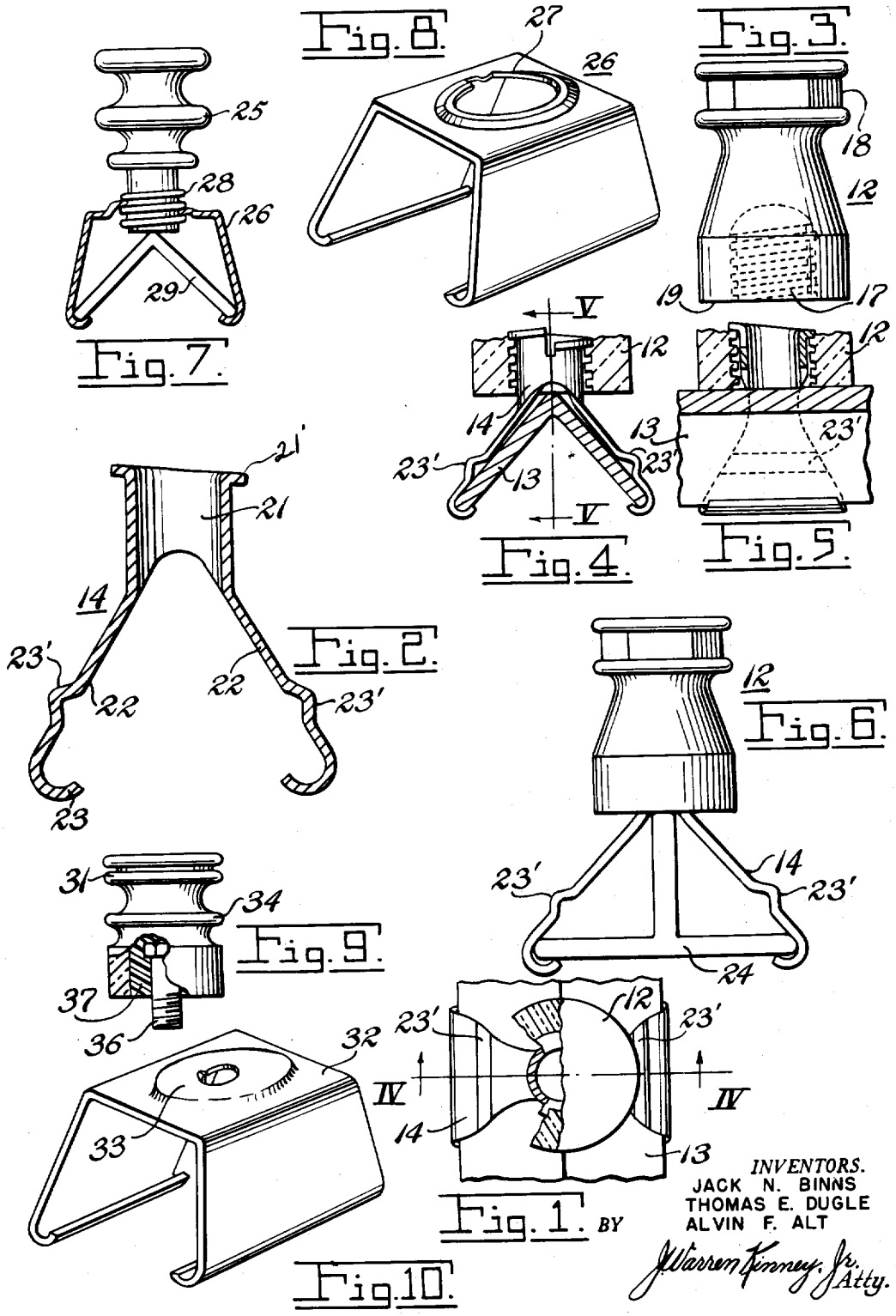
INVENTORS.
JACK N. BINNS
THOMAS E. DUGLE
ALVIN F. ALT
BY J. Warren Kinney, Jr. Atty.

United States Patent Office

Re. 24,127

Reissued Mar. 13, 1956

24,127

ADJUSTABLY MOUNTED INSULATOR ASSEMBLY

Jack N. Binns and Thomas E. Dugle, Cincinnati, and Alvin F. Alt, Deer Park, Ohio, assignors to Planet Products Corporation, Cincinnati, Ohio, a corporation of Ohio Original No. 2,609,418, dated September 2, 1952, Serial No. 122,022, October 18, 1949. Application for reissue August 31, 1953, Serial No. 377,753

4 Claims. (Cl. 174—163)

Matter enclosed in heavy brackets [ ] appears in the original patent but forms no part of this reissue specification; matter printed in italics indicates the additions made by reissue.

This invention relates to a mounting for electric insulators and more particularly relates to a mounting for the type of insulator employed in supporting an electrified fence wire or the like.

In the installation of an electrified fence wire, insulators must be mounted on posts at regular intervals. The job of mounting insulators has heretofore been troublesome because of the need for special tools and for the use of a number of separate parts for mounting each insulator.

An object of this invention is to provide an insulator mouuting which requires only a single part in addition to the insulator to mount the insulator on a post.

A further object of this invention is to provide an insulator mounting for which no tools are required for mounting the insulator.

A further object of this invention is to provide an insulator mounting which can be snapped onto a post and need not be slipped over the top of the post and down along the post.

A further object of this invention is to provide an inexpensive mounting clip for use with insulators, which clip can readily be manufactured in large quantities.

A further object of this invention is to provide an insulator mounting clip having a pair of oppositely directed resilient arms adapted to snap over and engage oppositely directed flanges of a metal fence post of L or T shape or the like to hold an insulator on the fence post.

A preferred embodiment of this invention includes an insulator mounting clip which comprises a threaded central portion and a pair of arms diverging from the central portion. The arms are provided with flanges at the ends thereof adapted to engage and grip opposite edges of a fence post. The threaded central portion of the clip is adapted to engage a threaded end of an insulator, and the insulator is provided with a bearing surface which can bear on a central portion of the post to hold the clip arms in tension and maintain the central portion of the clip spaced from the post so that the clip arms and the bearing surface of the insulator grip the post firmly. No tools are required for attaching the clip and insulator to a post. The clip is designed particularly for use with a metal post of L or T shape having oppositely directed flanges which the free ends of the clip arms can engage or other types of posts having suitable extensions or flanges which the clip arms can engage.

The above and other objects and features of the invention will in part be apparent and will in part be obvious from the following detailed description, and the drawing, in which:

Figure 1 is a view in side elevation, partly broken away and in section, showing a fragment of a vertical fence post to which an insulator is attached by means of a clip structed in accordance with a second embodiment of this invention;

Fig. 2 is a view in longitudinal section of the clip illustrated in Fig. 1;

Fig. 3 is a plan view of the insulator shown in Fig. 1;

Fig. 4 is a partial sectional view along line IV—IV in Fig. 1, the clip being shown in plan;

Fig. 5 is a view in section taken along a line V—V in Fig. 4;

Fig. 6 is a plan view showing the insulator and clip illustrated in Figs. 1 to 5 inclusive, the insulator and clip being shown attached to a T-shaped fence post;

Fig. 7 is a plan view showing a clip and insulator constructed in accordance with a second embodiment of this invention;

Fig. 8 is an enlarged perspective view showing the clip illustrated in Fig. 7;

Fig. 9 is a plan view, partly broken away and in section of another insulator; and Fig. 10 is a perspective view showing a clip designed for use with the insulator illustrated in Fig. 9.

In the following detailed description and the drawing, like reference characters indicate like parts.

In Figs. 1, 4, and 5 inclusive an insulator 12 is shown attached to an angle-shaped fence post 13. A clip 14 holds the insulator on the post.

The insulator 12, as shown in Fig. 3, includes a one-piece body having an internally threaded socket or well 17 at one end thereof. The other end is provided with a head 18 to which a wire may be attached. The mouth of the well forms a bearing surface 19.

[The clip 14 (Fig. 2) includes a central portion 21 in the form of an externally threaded neck.] *The clip 14 (Fig. 2) comprises a central portion 21 in the form of a neck or shank having an external thread 21' thereon. In the form disclosed in Fig. 2 the thread is formed by outwardly flanging the upper end of the neck.* Side arms 22 diverge from the central portion of the clip, and the side arms 22 are provided with return bends 23 at the ends thereof which can engage free edges of the flanges of the angle-shaped fence post 13, as shown most clearly in Fig. 4. As shown in Figs. 2 and 4, the arms 22 may be provided with U-bent sections *or transverse areas of flexure* 23' to render the arms resilient on extension so that the arms can be drawn up when attached to a post to grip the post firmly. The well of the insulator body is threaded to the central portion of the clip, and when the clip and insulator are attached to the fence post, the bearing surface 19 of the insulator body bears on the central portion or peak of the fence post 13 to hold the arms of the clip in tension, as shown in Figs. 4 and 5, so that the arms of the clip and the bearing surface of the insulator firmly grip the fence post.

The assembly of clip and insulator can quickly and readily be attached to the fence post without the use of any tools. The clip may be formed of resilient metal or other resilient material and may be slipped over the end of the fence post or may be pushed against the side of the fence post to spread the arms of the clip sufficiently to permit the return bent ends 23 to snap over the post. Then the insulator may be screwed tight against the post to hold the clip arms in tension and cause the clip arms to grip the post. Only a clip is required in addition to the insulator to hold the insulator on a post and no tools are required for attaching the clip and insulator to the post.

In Fig. 6 the insulator and clip, illustrated in Figs. 1 to 5 inclusive, are shown mounted on a fence post 24 of T-shape. The return bent ends 23 of the clip arms engage outwardly extending flanges of the cross bar of the T while the bearing surface of the insulator 12 engages the staff of the T to hold the insulator on the post.

In Figs. 7 and 8 an insulator 25 and a clip 26 are shown which differ from the clip and insulator shown in Figs. 1 to 6 inclusive in that the clip 26 is provided with an internally threaded central portion 27, and the insulator 25 is provided with an externally threaded stud portion 28 which can extend through the central part of the clip and bear on the central part or apex of an angle-shaped fence post 29.

In Figs. 9 and 10 are shown an insulator 31 and clip 32 which differ slightly from those shown in Figs. 7 and 8. The clip 32 is provided with a central internally threaded portion 33. The insulator 31 includes a body portion 34 and a separate stud member 36 which extends from the body portion 34. The stud extends from a well at an end of the insulator body portion 34, and the stud 36 may be held in the well by means of an insert 37 of a bonding material, for example, sulphur or the like, poured into the well about the head end of the stud or the stud may be molded in the insulator. The insulator and clip shown in Figs. 9 and 10 operate in the same manner as those shown in Figs. 7 and 8.

The clips provided by the present invention are readily adaptable for mass production. Only a single part is required in addition to an insulator to mount the insulator on a fence post, and the insulator can quickly and readily be mounted without the aid of special tools.

The clips and insulators are particularly adapted for use with angle and T-shaped posts having oppositely directed flanges but similar clips and insulators may be used with other forms of posts, for example square, rectangular, and circular posts.

The embodiments of the invention described above and disclosed in the drawings are subject to structural modification without departing from the spirit and scope of the appended claims.

Having described our invention what we claim as novel and desire to secure by Letters Patent is:

*1.* An insulator assembly for mounting on an upright post having a pair of opposed flanges, said assembly comprising a one-piece clip formed of resilient material and having a central threaded portion, a pair of arms diverging outwardly from the central portion at an angle to each other and presenting inclined surfaces on opposite sides of the axis of the central portion, and a return bend at the free end of each arm, said return bends being directed inwardly toward the axis of the central threaded portion so that when the return bends are urged against the flanges, the arms of the clip are urged apart to snap over the edges of the flanges, and a one-piece insulator having a threaded bore for threading onto the threaded portion of said clip and being provided with a base, said base abutting the post thereby to force the diverging arms toward each other to secure the return bends and flanges of said clip and post, said insulator having a portion spaced from said clip to which a charged wire may be secured.

*2. A one-piece resilient insulator mounting clip of the snap-on type comprising a centrally threaded portion, a pair of arms diverging outwardly from the threaded portion at an angle to each other and presenting inclined surfaces on opposite sides of the axis of the central portion, and a return bend at the free end of each arm, said return bends being directed inwardly toward and along the axis of the central threaded portion and the arms having transverse resilient areas of flexure intermediate the threaded portion and the ends thereof.*

*3. A clip as defined in claim 2 in which the threaded portion is at the upper end thereof and comprises a rounded shank member with the arms extending divergently outwardly from opposite sides of the shank.*

*4. A clip as defined in claim 2 in which each arm has an elongated transverse dimpled portion intermediate its length providing a transverse resilient area of flexure therein.*

References Cited in the file of this patent or the original patent

UNITED STATES PATENTS

| | | |
|---|---|---|
| 443,005 | Ramsey | Dec. 16, 1890 |
| 540,693 | Seely | June 11, 1895 |
| 778,420 | Locke | Dec. 27, 1904 |
| 2,278,852 | Hoffman | Apr. 7, 1942 |
| 2,437,344 | Behlmann | Mar. 9, 1948 |
| 2,438,237 | Toelke | Mar. 23, 1948 |
| 2,468,907 | Wilson et al. | May 3, 1949 |